(12) United States Patent
Martinez (10) Patent No.: US 11,094,975 B2
(45) Date of Patent: Aug. 17, 2021

(54) ELECTROLYTE LEVEL SENSING SYSTEM AND METHOD FOR BATTERY MONITORING

(71) Applicant: Vertiv Corporation, Columbus, OH (US)

(72) Inventor: Juan Martinez, Miami, FL (US)

(73) Assignee: Vertiv Corporation, Columbus, OH (US)

( * ) Notice: Subject to any disclaimer, the term of this patent is extended or adjusted under 35 U.S.C. 154(b) by 120 days.

(21) Appl. No.: 16/170,630

(22) Filed: Oct. 25, 2018

(65) Prior Publication Data

US 2019/0131670 A1 May 2, 2019

Related U.S. Application Data

(60) Provisional application No. 62/580,227, filed on Nov. 1, 2017.

(51) Int. Cl.
  *H01M 10/48* (2006.01)
  *G01F 23/292* (2006.01)
  *G01F 23/00* (2006.01)

(52) U.S. Cl.
  CPC ...... *H01M 10/484* (2013.01); *G01F 23/0069* (2013.01); *G01F 23/292* (2013.01); *G01F 23/2921* (2013.01); *G01F 23/0007* (2013.01)

(58) Field of Classification Search
  CPC .............. H01M 10/484; G01F 23/2921; G01F 23/292; G01F 23/284; G01F 23/0007
  See application file for complete search history.

(56) References Cited

U.S. PATENT DOCUMENTS

| 4,703,314 A | 10/1987 | Spani |
| 4,984,462 A | 1/1991 | Hass, Jr. et al. |
| 5,704,923 A | 1/1998 | Chiu-Hsiung et al. |

(Continued)

FOREIGN PATENT DOCUMENTS

| CN | 101504303 A | 8/2009 |
| CN | 104457915 A | 3/2015 |

(Continued)

OTHER PUBLICATIONS

International Search Report and Written Opinion issued in corresponding International Application No. PCT/US2018/057648 dated Jan. 23, 2019, 12 pp.

*Primary Examiner* — Paul M. West
(74) *Attorney, Agent, or Firm* — Harness, Dickey & Pierce, P.L.C.

(57) ABSTRACT

An electrolyte monitoring system is disclosed which has an interface module and a sensor assembly. The sensor assembly is attachable to an exterior wall surface of a battery cell for monitoring a level of an electrolyte within the battery cell. The sensor assembly may include an infrared (IR) sensor and a cradle. The IR sensor may be configured to communicate with the interface module and to detect when the electrolyte level within the battery cell drops below a predetermined level. The cradle is configured to be affixed to the exterior wall surface of the battery cell at a desired elevational position in relation to the electrolyte level in the cell. The cradle enables mounting and removal of the IR sensor from the cradle without an external tool.

21 Claims, 11 Drawing Sheets

(56) References Cited

U.S. PATENT DOCUMENTS

| | | | |
|---|---|---|---|
| 6,133,709 A * | 10/2000 | Puchianu | B60L 3/0046 |
| | | | 320/116 |
| 9,138,091 B2 | 9/2015 | Zhao et al. | |
| 9,194,733 B2 | 11/2015 | Fu et al. | |
| 2010/0134303 A1 | 6/2010 | Perkins | |
| 2012/0138824 A1 | 6/2012 | Wen et al. | |
| 2013/0302655 A1 | 11/2013 | Deveau et al. | |
| 2016/0351024 A1* | 12/2016 | Shigematsu | G08B 5/36 |
| 2016/0378153 A1* | 12/2016 | Kelly | G06F 1/266 |
| | | | 710/313 |

FOREIGN PATENT DOCUMENTS

| | | |
|---|---|---|
| EP | 0753722 A2 | 1/1997 |
| EP | 2393183 A2 | 12/2011 |
| GB | 2544868 A | 5/2017 |
| JP | S56155815 A | 12/1981 |
| JP | S5819512 A | 2/1983 |
| JP | H0629046 A | 2/1994 |
| JP | 2000205931 A | 7/2000 |
| JP | 2010040319 A | 2/2010 |
| JP | 2016024846 A | 2/2016 |
| WO | 2015187682 A1 | 12/2015 |
| WO | 2017051204 A1 | 3/2017 |

* cited by examiner

ELECTROLYTE LEVEL SENSING SYSTEM AND METHOD FOR BATTERY MONITORING

CROSS-REFERENCE TO RELATED APPLICATIONS

This application claims the benefit of U.S. Provisional Application No. 62/580,227, filed on Nov. 1, 2017. The entire disclosure of the above application is incorporated herein by reference.

FIELD

The present disclosure relates to level sensing systems for use in monitoring electrolyte levels in battery cells, and more particularly to an infrared based monitoring system for monitoring electrolyte levels in a plurality of battery cells associated with a utility battery backup power supply.

BACKGROUND

The statements in this section merely provide background information related to the present disclosure and may not constitute prior art.

At the present time it is important to monitor the status of wet cell batteries used in utility power applications. Such applications often make use of batteries that each have multiple cells. The status, and more particularly the electrolyte level, of each battery cell needs to be monitored to ensure that the electrolyte levels of the cells are at an adequate level. If each battery cell needs to be periodically visually inspected to ensure that its electrolyte level is at least at a minimum predetermined level, this can impose a significant burden on utility power center personnel.

It would be a significant advantage to provide a monitoring system that is able to monitor the electrolyte level of every battery cell used in a utility power setting, and provide a real time indication of an alarm indication to a central control panel or display terminal, in the event an electrolyte level of any battery cell drops below the predetermined minimum level, or if the battery cell should rise above a predetermined temperature for any reason. Such a system would enable dozens, hundreds or more individual battery cells to be monitored in real time efficiently and with a minimum of involvement of maintenance personnel.

SUMMARY

In one aspect the present disclosure relates to an electrolyte monitoring system. The system may have an interface module and an infrared (IR) sensor. The IR sensor is supported from an exterior wall surface of a battery cell for monitoring a level of an electrolyte within a cell of the battery. The IR sensor may be configured to communicate with the interface module and to detect when the electrolyte level within the battery cell drops below a predetermined level. A cradle is configured to be affixed to the exterior wall surface of the battery cell at a desired elevational position on the exterior wall surface. The cradle includes a plurality of flexible arm portions for receiving and retaining the IR sensor on the cradle without external fasteners.

In another aspect the present disclosure relates to an electrolyte monitoring system. The system may have an interface module and a plurality of sensor assemblies attachable to exterior wall surfaces of a plurality of battery cells. The sensor assemblies may be operative to monitor levels of electrolytes within the battery cells. Each one of the sensor assemblies may include an infrared (IR) sensor, a cradle, an input port and an output port. The IR sensor may be configured to communicate with the interface module and to detect when an electrolyte level within a given one of the battery cells drops below a predetermined level. The cradle may be configured to be affixed to the exterior wall surface of the given one of the battery cells, and at a desired elevational position in relation to the electrolyte level in the given one of the battery cells. The cradle enables mounting and removal of the IR sensor from the cradle without an external tool. The input and output ports enable the sensor assemblies to be intercoupled in to one another as a string sensors, where a first one of the IR sensors has its input port coupled to the interface module, and wherein the interface module communicates with all of the IR sensors.

In still another aspect the present disclosure relates to a method for monitoring a level of an electrolyte level in a battery cell. The method may involve securing a cradle to an exterior wall surface of the battery cell at a desired elevational position on the battery cell. The method may further involve removably positioning an infrared (IR) sensor in the cradle, and where the IR sensor is operable to sense a level of the electrolyte in the battery cell and to provide an electrical signal relating thereto. The method may further involve coupling an interface module for electrical communication with the IR sensor via a cable to receive electrical signals from the IR sensor. The electrical signals indicate at least one of a low electrolyte level and an acceptable electrolyte level.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
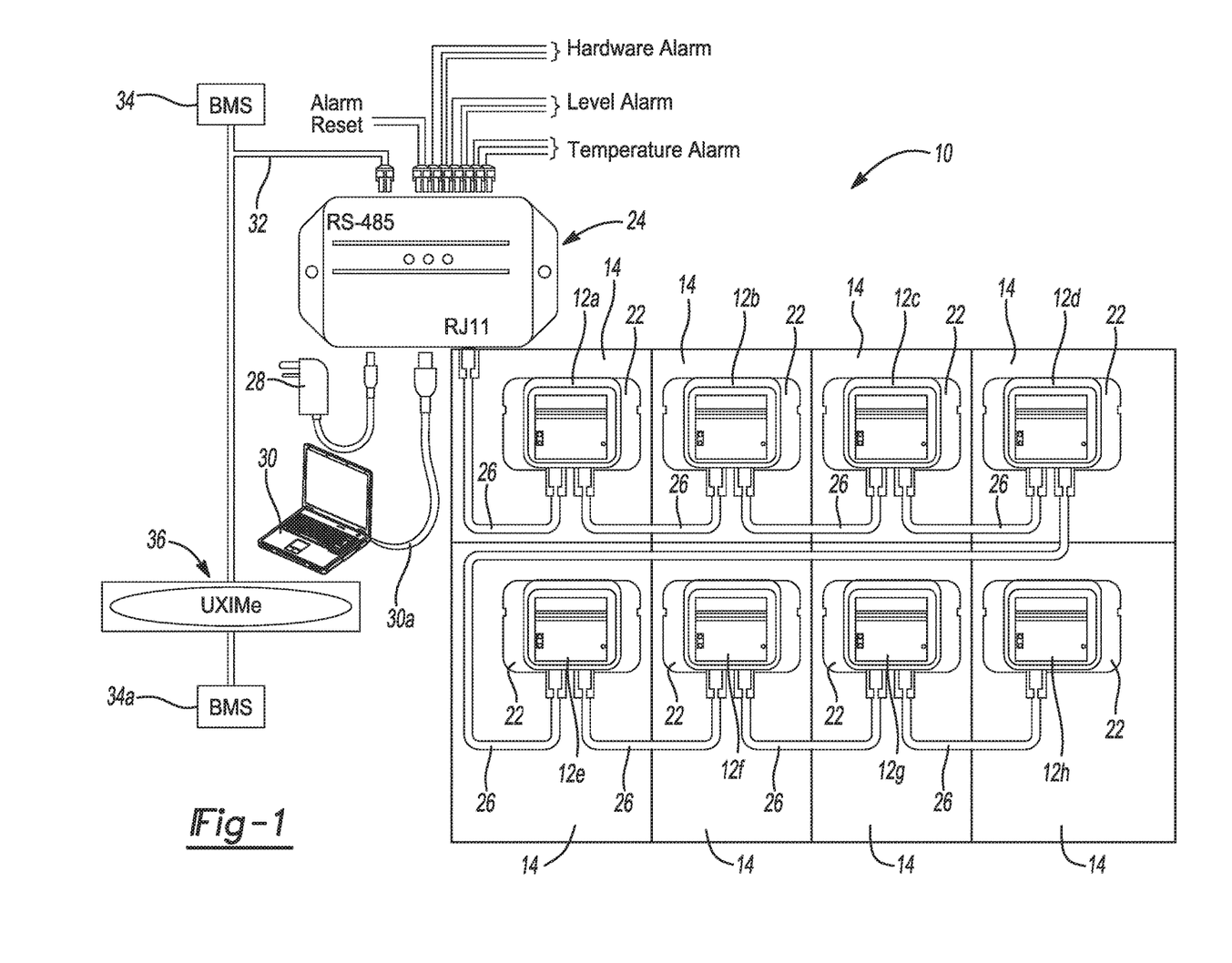
FIG. 1 is a view of one embodiment of a system in accordance with the present disclosure implemented for monitoring electrolyte levels in a plurality of independent battery cells used in a utility power application, and wherein a plurality of sensor modules of the system are secured to exterior wall surfaces of separate battery cells.

Referring to FIG. 1, one embodiment of a system 10 is shown for monitoring, in real time, an electrolyte level for each battery cell of an uninterruptible power supply (UPS). It will be appreciated immediately that while the present disclosure is discussed in connection with monitoring the battery cells of a UPS, which are often employed in modern day utility power centers, in practice the system 10 could be used with little or no modification in any application where it is important to closely monitor the electrolyte levels of each battery cell, or a collection cells formed within a single battery. As such, the system 10 is not limited to use with only UPS systems or to batteries which form a single cell.

In this example the system 10 includes a plurality of infrared (IR) electrolyte level sensors 12a-12h for independently monitoring an electrolyte level within each battery cell 14 of a plurality of adjacently positioned battery cells 14. Each sensor 12a-12h is mounted on a cradle 22, with each cradle being firmly attached at a specific location on the exterior wall surface of an associated battery cell 14, to be able to monitor when the electrolyte level drops to a predetermined low level. Each cradle 22 may be attached by an adhesive applied to a portion of the cradle or by any other suitable means which does not interfere with operation of the battery cells 14. This feature will be explained further in the following paragraphs.

The system 10 further includes an interface module 24 connected to each of the sensors 12a-12h via a plurality of eight conductor RJ11 cables 26 in daisy chained fashion. While only eight sensors 12a-12h are shown coupled to the interface module 24, it will be appreciated that the interface module 24 is capable of coupling to a larger plurality of sensors, and in one specific implementation with sixty such sensors. It will also be appreciated that the interface module 24 may be constructed to enable communications with even more than 60 independent sensors 12.

The interface module 24 may be powered by a suitable AC/DC power adaptor 28 (e.g., for providing a +12 VDC input signal) and may also be coupled to a computing device 30 via a USB cable 30a for enabling a worker to configure and/or communicate with the system 10 or to reset an alarm generated by the system. The computing device 30 in this example is shown as a laptop computer, although any type of personal electronic device (e.g., smartphone, tablet, etc.), desktop computer, or simply a communications terminal, could be used. The interface module 24 may be coupled via a suitable bus 32, in this example using the MODBUS protocol with an RS-485 serial interface connection. The bus 32 connects directly to a building management system (BMS) 34 which collects and monitors information from a variety of subsystems used in utility power center monitoring applications. More typically, the interface module 24 may be in communication with a remote BMS 34a via an Ethernet connection and a real time UXIMe (Universal Xplorer Industrial Monitor available from Albércorp., a Vertiv Co.) 36. The UXIMe is well adapted for use with utility bulk power systems and NERC (North American Electric Reliability Corporation) compliance. The interface module 24 may be configured to output separate temperature, electrolyte level and hardware alarms, as well as to receive a signal to reset all alarms. The alarms in this example are preferably transmitted to BMS 34a via the UXIMe 36a, but may be transmitted to the computing device 30 via the USB cable 30a as well. The alarm reset may be applied by either the computing device 30, the BMS 34 or the remote BMS 34a.

Figure 2:
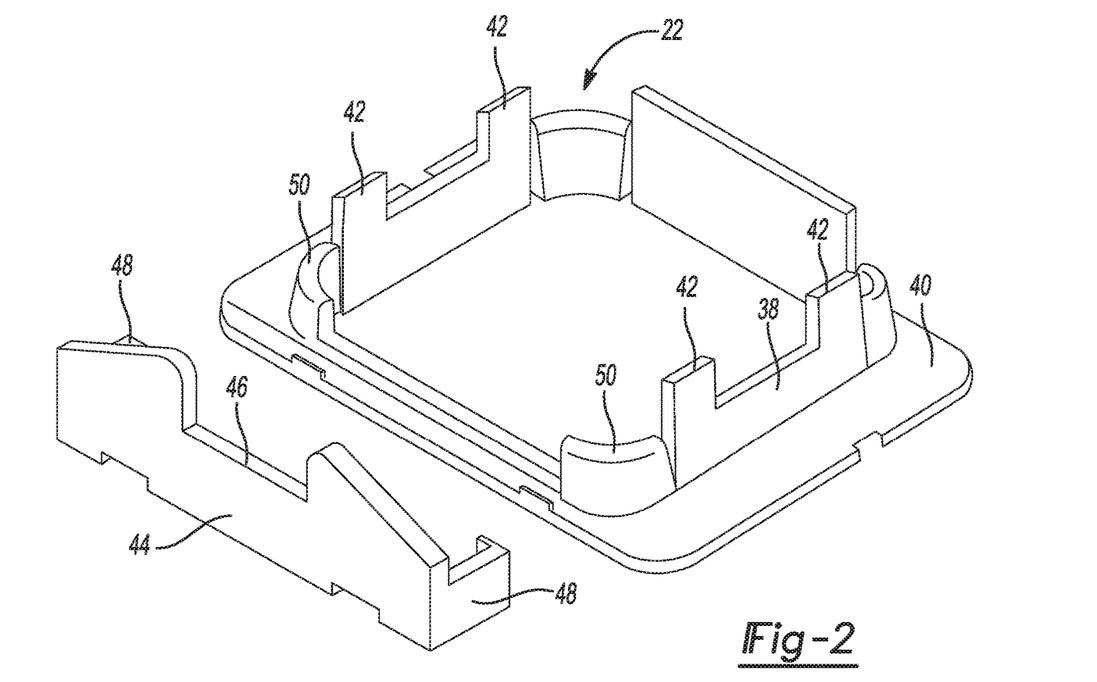
FIG. 2 is an elevational view of a sensor cradle that may be affixed to an exterior wall surface of a battery cell to hold an electrolyte level sensor on the exterior wall surface.
Figure 4:
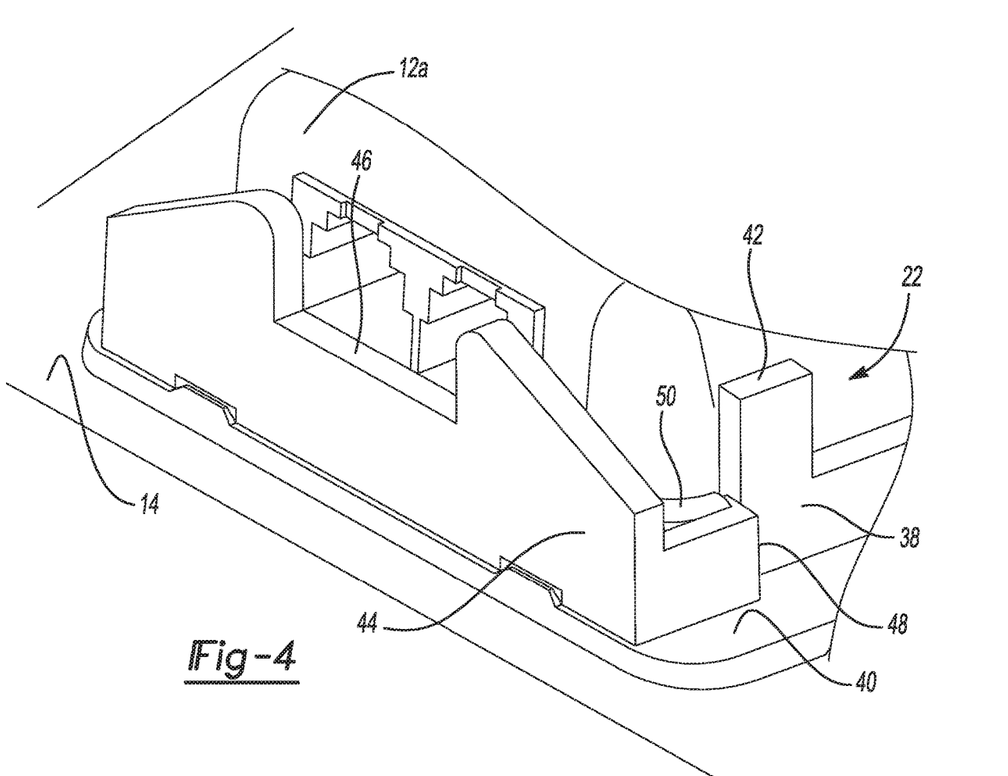
FIG. 4 is a perspective view of a portion of the cradle shown in FIG. 2 with a cradle cable locking clip secured to the cradle.

Referring to FIG. 2, the cradle 22 is shown in greater detail. The cradle 22 may be formed as a single piece component from a suitable plastic and may include a planar wall portion 38, a peripheral wall 40 and a plurality of flexible arm portions 42. The planar wall portion 38 is dimensioned to receive the one of the sensors 12a-12h and to retain the sensor thereon by frictional engagement with the flexible arm portions 42. With additional reference to FIG. 4, a cradle cable locking clip 44 having a cutout section 46 may be secured to the planar wall portion 38 using end portions 48 to engage with corner portions 50 of the planar wall portion 38. The cradle cable locking clip 44, once installed, allows electrical cables associated with electrical connectors attached to the sensor 12a-12h to pass through the cutout 46 while still maintaining the connector(s) secured to the sensor.

Figure 3:
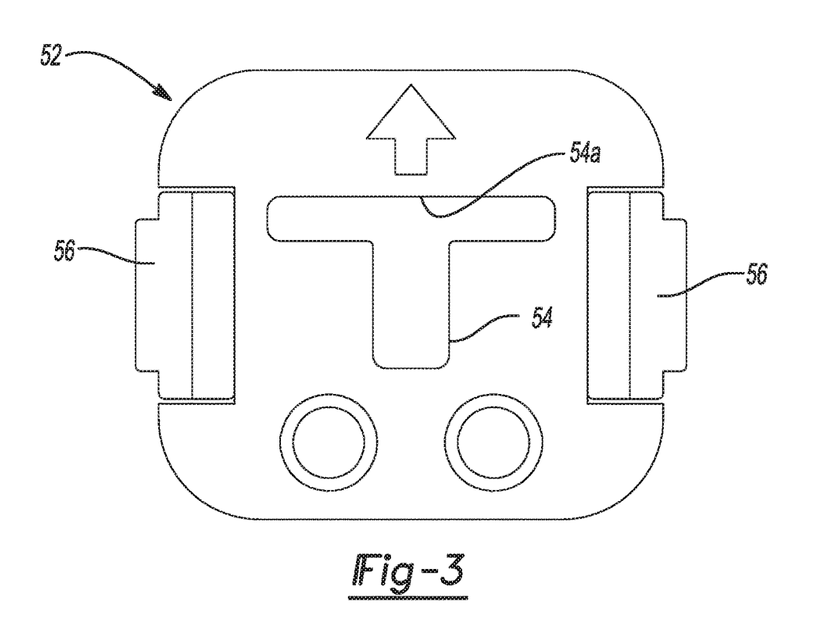
FIG. 3 is a view of an alignment tool that may be used to help in affixing the cradle, shown in FIG. 2, at a precise predetermined position on the exterior wall surface of a battery cell, to enable a sensor installed in the cradle to be positioned to detect a minimum electrolyte level within the battery cell.
Figure 5:
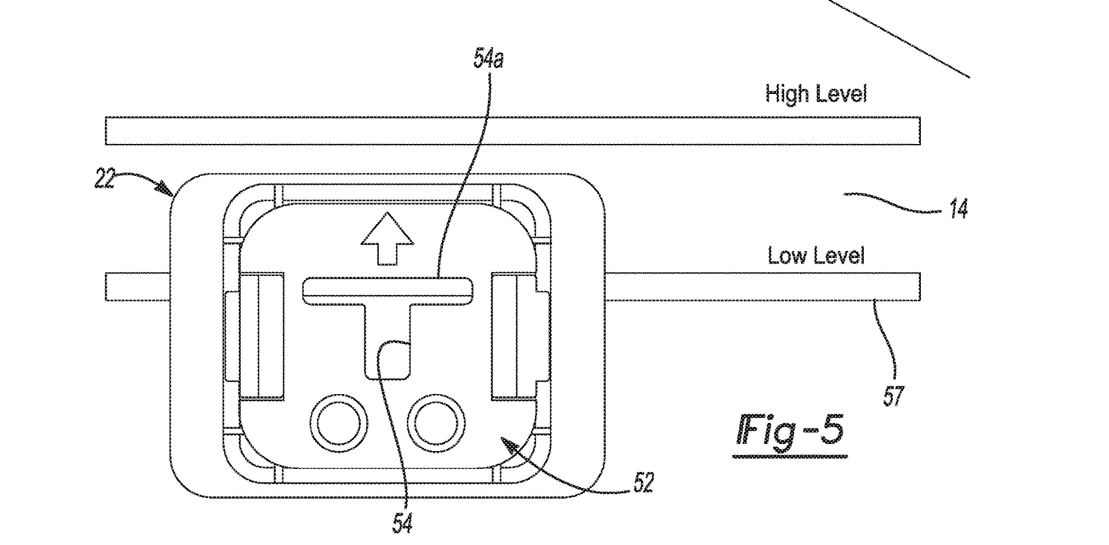
FIG. 5 is a diagram illustrating how the cradle alignment tool of FIG. 3 may be used with the cradle to help position the cradle at an electrolyte "LOW LEVEL" mark on an exterior wall surface of the battery cell.
Figure 10:
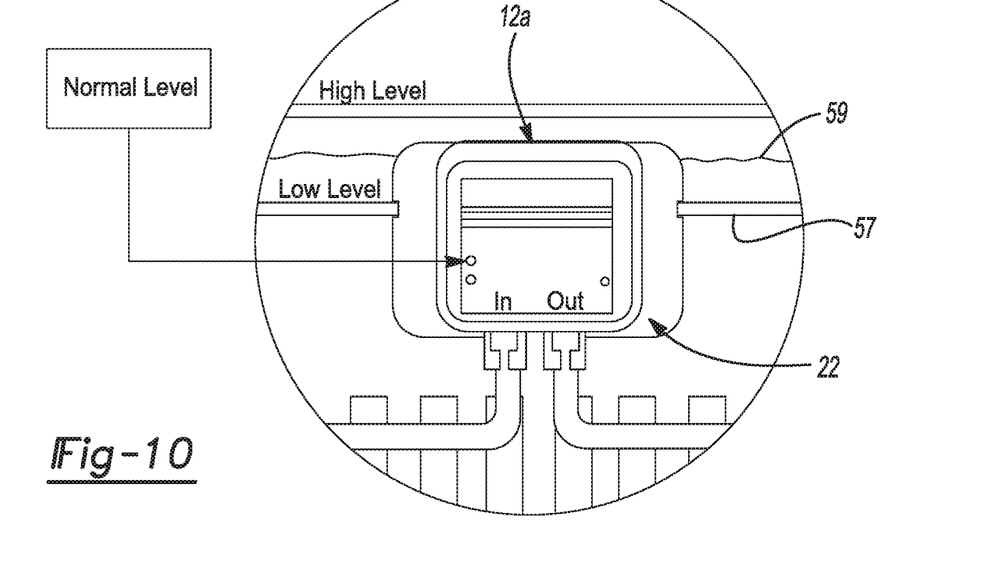
FIG. 10 is a simplified diagram showing one of the cells of the battery of FIG. 1 with an electrolyte level that is within an acceptable range, relative to an elevational position of the sensor which is monitoring that particular battery cell.
Figure 11:
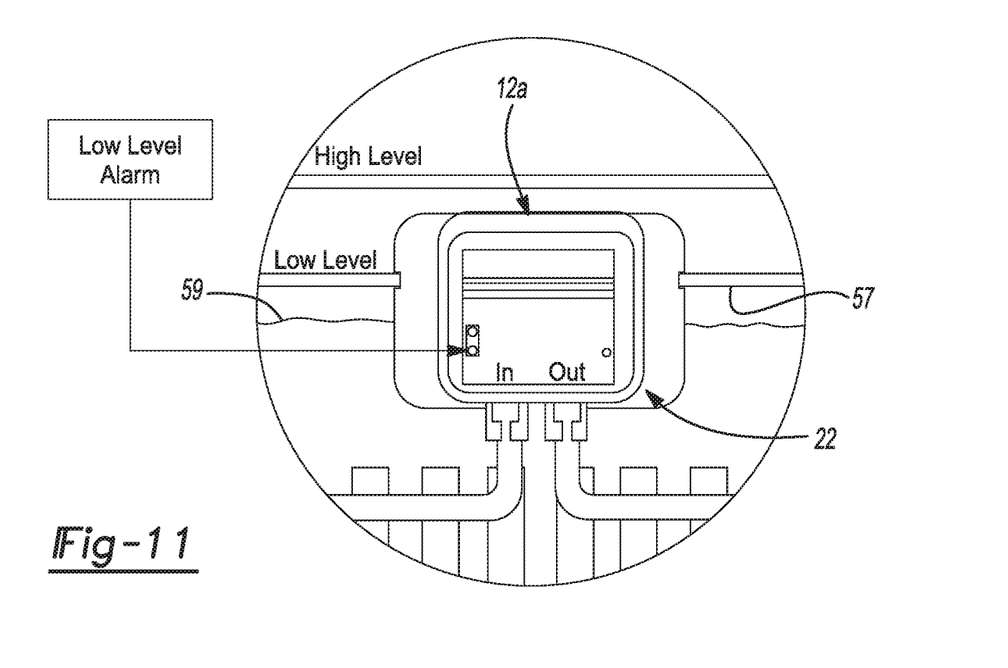
FIG. 11 is a simplified diagram showing the cell of FIG. 10 but with the electrolyte level below the predetermined minimum fluid level, thus causing the sensor monitoring that particular battery cell to generate a "LOW LEVEL" electrolyte fluid alarm.

FIG. 3 illustrates a sensor alignment tool 52 that may be temporarily positioned in each one of the cradles 22 prior to installation of the sensors 12a-12h on the exterior wall surfaces of the battery cells 14. The sensor alignment tool 52 in this example may be made from plastic, metal, aluminum, etc., and includes a T-shaped cutout 54 with an upwardly pointing arrow, and a pair of shoulder portions 56. The dimensions of the sensor alignment tool 52 are such that it may be slidably inserted into the cradle 22 and is retained in the cradle by the flexible arm portions 42. Once the sensor alignment tool 52 is attached to the cradle 22, a protective cover covering an adhesive on a backside of the peripheral wall 40 may be removed. With the electrolyte level of a given one of the cells 14 at a full level, the installer positions the cradle 22 on the exterior wall surface of the given one of the cells 14 so that a horizontal portion 54a of the T-shaped cutout 54 is positioned at a marking line representing a minimum low electrolyte level 57, as shown in FIG. 5. The installer then presses the cradle 22 securely against the exterior wall surface to adhere the cradle at the desired elevational position on the exterior wall surface of the given one of the battery cells 14. The sensor alignment tool 52 can then be removed and one of the sensors 12a-12h installed in the cradle 22. These operations are performed to attach each one of the cradles 22 to the exterior wall surface of each of the battery cells 14, and to install each one of the sensors 12a-12h in their respective cradles 22. Once the sensors 12a-12h are installed, the RJ11 cables 26 can be used to couple the sensors 12a-12h to one another in a daisy chained arrangement. FIG. 10 illustrates an electrolyte level 59 above the predetermined minimum low level 57, in which case the electrolyte sensor 12a does not generate an alarm. FIG. 11 shows the electrolyte level 59 having dropped below the predetermined minimum low level 57, in which case the sensor 12a generates a "LOW LEVEL" alarm that will be received by the interface module 24.

Figure 6:
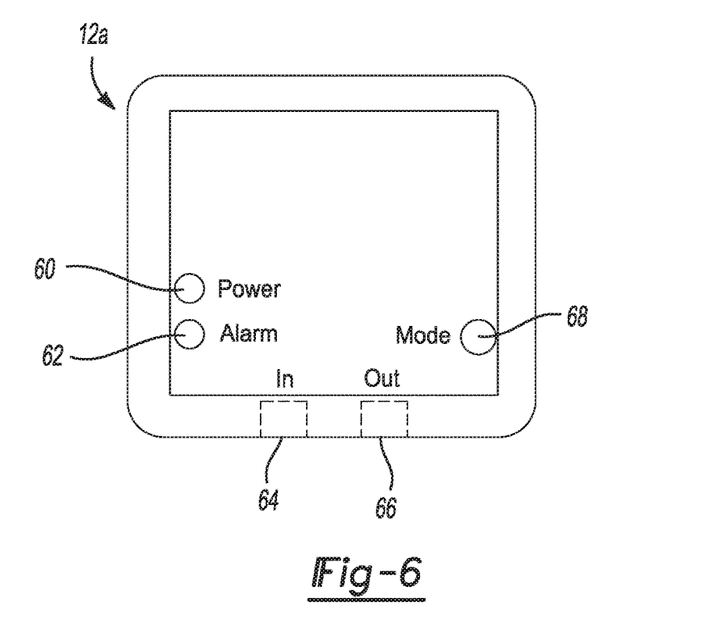
FIG. 6 is a plan view of one of the IR sensors shown in FIG. 1.

Referring to FIG. 6, the sensor 12a is shown in greater detail. In this example the sensors 12a-12h are all identical in construction, although it will be appreciated that they need not be identically constructed. In this example, however, each sensor 12a-12h comprises a VCNL4040 sensor available from Vishay Semiconductors of Shelton, Conn. Each sensor 12a-12f forms a fully integrated, proximity and ambient light sensor with infrared emitter, I²C interface and interrupt function on a single chip. The sensor 12a includes a "POWER" LED 60 for visually indicating when the sensor 12a is powered on, an "ALARM" LED 62 which visually indicates that an alarm condition has occurred, an "IN" port 64 for connecting one of the RJ11 cables 26, an "OUT" port 66 for connecting another one of the RJ11 cables 26, and a mode switch 68. The mode switch 68 may be used to place the sensor 12a in one of two different operating modes: 1) a "Normal" mode and 2) a "Test" mode. The Normal mode is the default operational mode. In the Normal mode the sensor 12a remains powered on in a standby operating mode and obtains an electrolyte and temperature reading only when commanded to do so by the interface module 24. In this example the interface module 24 is programmed to scan every sensor 12a-12h every three (3) minutes. If an alarm condition is detected by any of the sensors 12a-12h, that particular sensor indicates the alarm condition to the interface module 24. The interface module 24 then stores, analyzes and commands the corresponding sensor 12a-12h that provided the alarm to indicate the alarm condition on its ALARM LED 62. In the Test mode the given sensor 12a-12h performs an electrolyte level and temperature reading every five (5) seconds and indicates the alarm condition on the ALARM LED 62. In the Test mode, the given sensor 12a-12h being tested can be physically removed from the cradle 22 and moved by hand back and forth over the predetermined minimum electrolyte level mark on the battery cell outer wall to test the detection capability of the sensor. There is no communication between the given sensor 12a-12h and the interface module 24 in when the sensor is operating in its Test mode.

Figure 7:
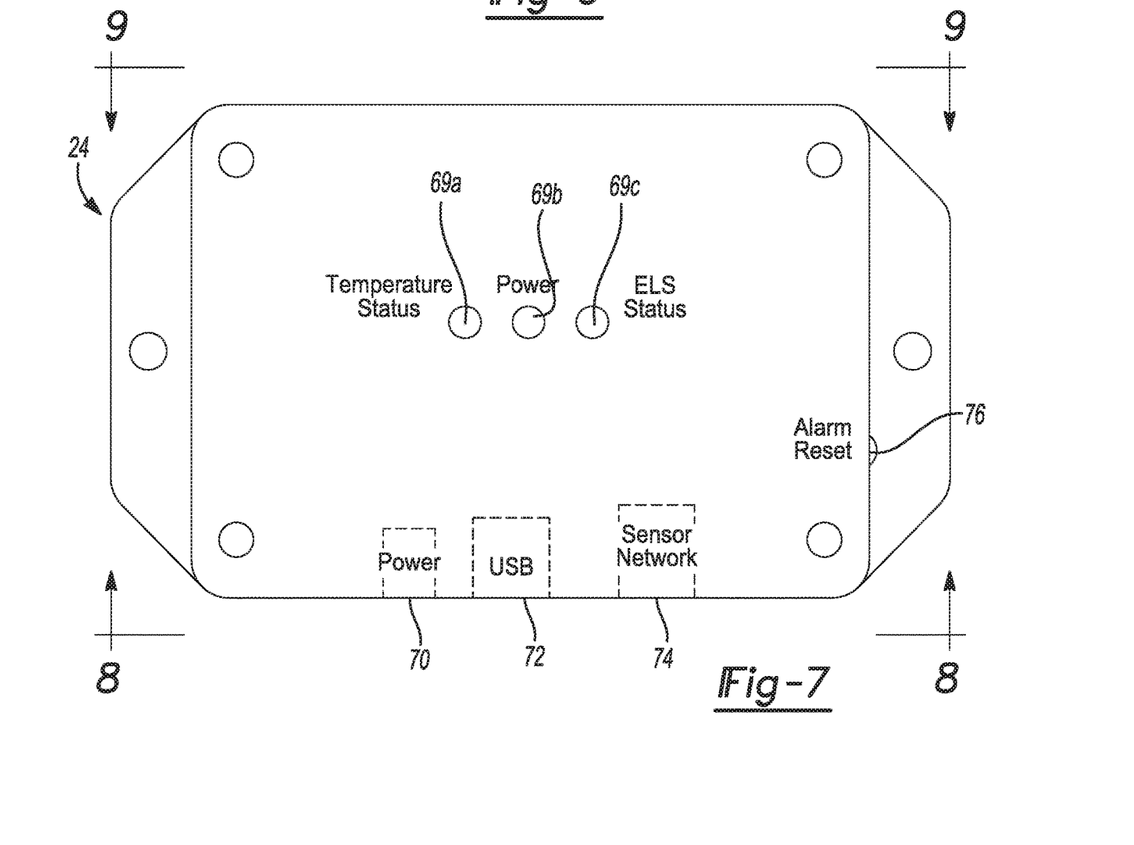
FIG. 7 is a plan view of the interface module shown in FIG. 1.
Figure 8:
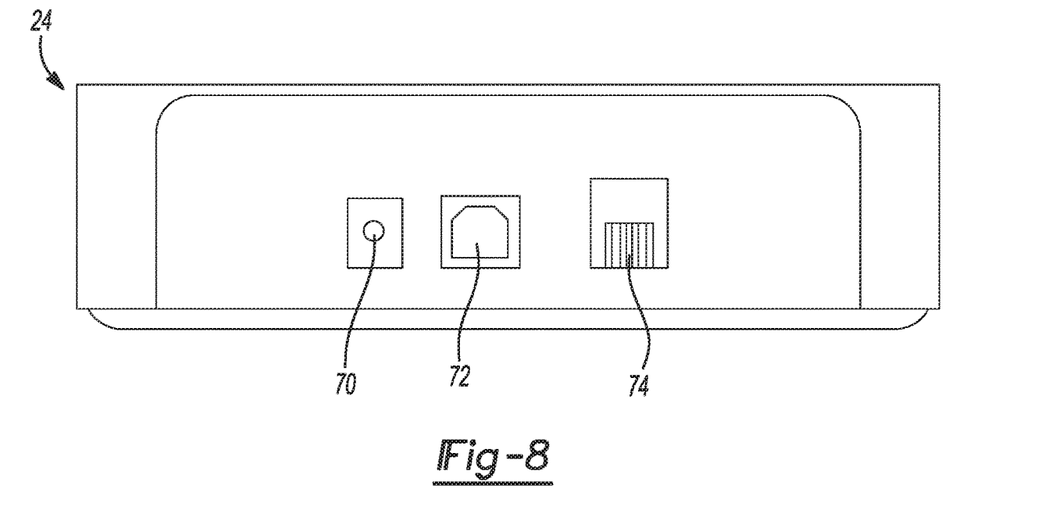
FIG. 8 is an end view of the interface module in accordance with directional line 8-8 in FIG. 7.
Figure 9:
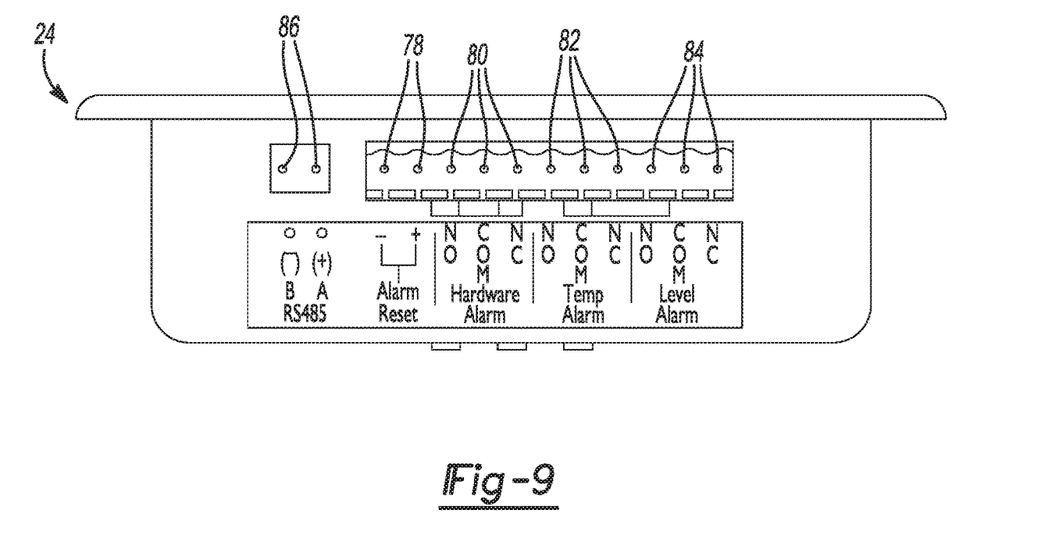
FIG. 9 is an end view of the interface module in accordance with directional line 9-9 in FIG. 7.

The interface module 24 is shown in greater detail in FIGS. 7-9. A TEMPERATURE STATUS LED 69a, a POWER LED 69b and an ELS STATUS LED 69c may be included for indicating various operational statuses of the system 10. These statuses will be discussed in greater detail in the following paragraphs. The interface module 24 also has a POWER IN port 70 for receiving DC power (e.g., +12 VDC) from the AC/DC power adapter 28, a USB port 72, and a SENSOR NETWORK port 74. The USB port 72 may be coupled to the computing device 30 shown in FIG. 1 to enable a user to configure the system 10, to reset alarms on the system 10 or to view real time data provided by the system 10. The SENSOR NETWORK port 74 is coupled to the "IN" port 64 of the first sensor 12a. An ALARM RESET button 76 may be provided which a user may depress for a predetermined time period (e.g., 5 seconds) to reset an alarm generated by one of the sensors 12a-12h. Alternatively, an alarm generated by any one or more of the sensors 12a-12h may be collectively reset by placing a +5 VDC signal on an ALARM RESET output port 78 shown in FIG. 9, which will apply the reset signal to all of the sensors virtually simultaneously.

Referring to FIG. 8, the DC POWER In port 70, USB port 72 and the SENSOR NETWORK port 74 are more clearly shown. FIG. 9 shows the ALARM RESET output port 78 along with three "C" contact banks 80, 82 and 84 for a HARDWARE ALARM, a TEMP ALARM and a LEVEL ALARM, respectively. The three contact banks 80-84 can be connected directly to a dedicated monitoring system or to the BMS 34 or BMS 34a shown in FIG. 1 to enable alarms received from any one of the sensors 12a-12h to be provided in real time to an external device or system. When connecting to the UXIMe battery monitor 36, these digital inputs should be configured as dry contact inputs. RS485 port 86 may be used to connect the interface module 24 via an RS485 connection to either the BMS 34 or the BMS 34a.

Once installation of the system 10 is complete and the system is powered up, the following indications may be observed on the interface module status LEDs 69a, 69b and 69c:

the POWER LED 69b (FIG. 7) may be pulsing green when the sensor 12a is in normal operation during a normal scan;

the POWER LED 69b may be pulsing an amber-red color when there is a hardware alarm in the system 10 (e.g., a network communication error condition with the sensor 12a);

the TEMPERATURE STATUS LED 69a (FIG. 7) may be a solid green color when all temperature sensor readings are between predetermined alarm thresholds;

the TEMPERATURE STATUS LED 69a may be a solid red color when one or more sensors in the string of sensors 12a-12h has a temperature reading outside of predetermined high and low temperature thresholds;

the ELS (Electrolyte Level Sensing) STATUS LED 69c (FIG. 7) may be a solid green color when all electrolyte level readings are sufficiently high (e.g., above the predetermined minimum low level); and the ELS STATUS LED 69c may be a solid red color when one or more of the sensors 12a-12h indicates a low electrolyte level condition.

On the sensor module 12a, the following conditions may be indicated by using the POWER LED 60, which may be a green LED, and the ALARM LED 62, which may be a red LED:

a pulsing green condition for the POWER LED 60 indicates proper operation of the sensor module 12a;

every three minutes the POWER LED 60 stays lit (i.e., is lit green) for a short period of time to show that the sensor 12a is taking an electrolyte and temperature reading; and illuminating the ALARM 62 LED (e.g., which may be a red LED) indicates that the battery cell 14 does not have the proper electrolyte level in that particular cell associated with a particular sensor module 12a, or has a sensed temperature in that particular battery cell which is outside of predetermined minimum and maximum temperature levels.

The present system 10, which uses infrared technology for its sensing, has several advantages over ultrasound technology. These advantages relate to production, installation, sensitivity, operating environment and longevity of the overall system.

Infrared sensors may be mass produced using precise manufacturing techniques, which reduce production costs by increasing the yield of the printed circuit assembly. The manufacturing process employed with infrared sensors significantly reduces the performance variance typically observed with traditional ultrasound sensors of similar cost. Furthermore, infrared sensors do not require the use of special coupling mediums, such as gel tape or silicone adhesives, that require set up time and are prone to aging, which can be accelerated by the ambient temperatures typical of battery rooms lacking temperature control systems.

The sensitivity of infrared sensors is also typically greater than ultrasound sensors because of the inherent advantage of detecting varying levels of light energy as opposed to detecting varying levels of sound energy. The sensitivity of the infrared receiver provides a level of confidence in level sensing that heretofore has not been achievable with ultrasound receivers of similar cost. Still further, unlike ultrasound sensors, infrared sensors are immune to variations in ambient noise, as well as temperature and humidity, which often occur in rooms either with or without temperature control.

Aging, along with changes to the operating environment typically experienced in battery rooms, can significantly reduce the longevity of ultrasound sensors when compared to infrared sensors. In demanding applications where extreme operating conditions and a 10-year service life are required, infrared sensors are generally viewed as being superior to ultrasound sensors.

Figure 12:
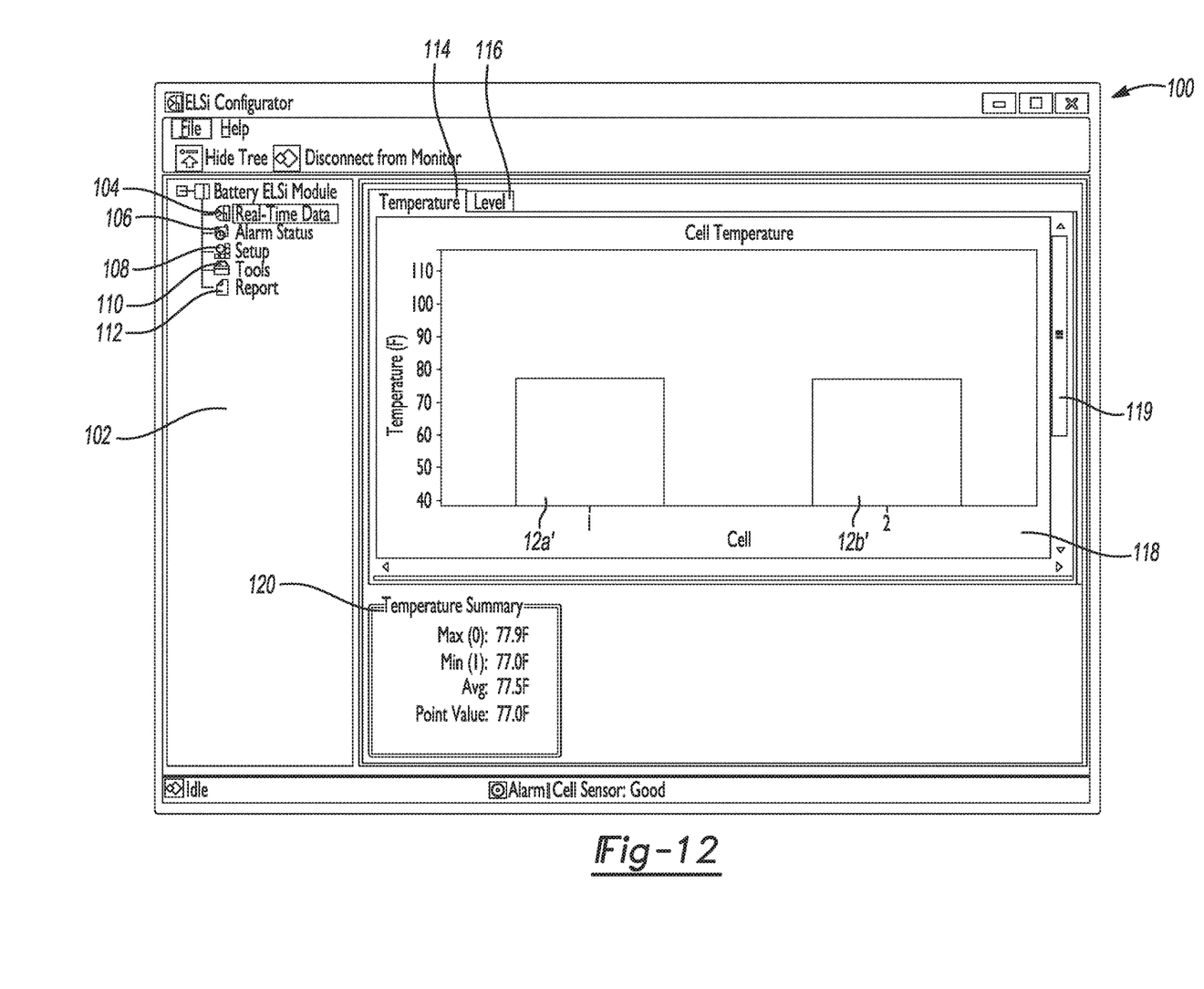
FIG. 12 illustrates a configuration program that may be run on the computing device shown in FIG. 1 to help a worker configure the interface module and sensor alarm thresholds, perform firmware updates, run reports, view the status of every sensor, as well as view real time information provided by the sensors.

Referring to FIG. 12, a screen 102 of a configurator program 100 is shown that enables a user to configure the system 10 and to view real time sensor information and check real time sensor status. The configuration program 100 may be installed and run on the personal computing device 30 shown in FIG. 1, or it may even be run from a remote computer communicating over a local area network or a wide area network.

The screen 102 shown in FIG. 12 enables user selections for displaying information on "Real-Time Data" 104, "Alarm Status" 106, "Setup" 108, "Tools" 110, and for generating a report 112. Tabs 114 and 116 permit the user to select either temperature, data or electrolyte level data for every sensor 12a-12h to be displayed. In the screen shown in FIG. 12, window 118 is illustrating temperature data 12a' and 12b' from only two sensors 12a and 12b, respectively, although in practice it will be appreciated that data from all of the sensors 12a-12h will be available simply by using one or more scroll bars 119 to scroll through all of the data that is available for display. A "Temperature Summary" section 120 may display a summary of all available temperature data from the sensors 12a-12h.

Figure 13:
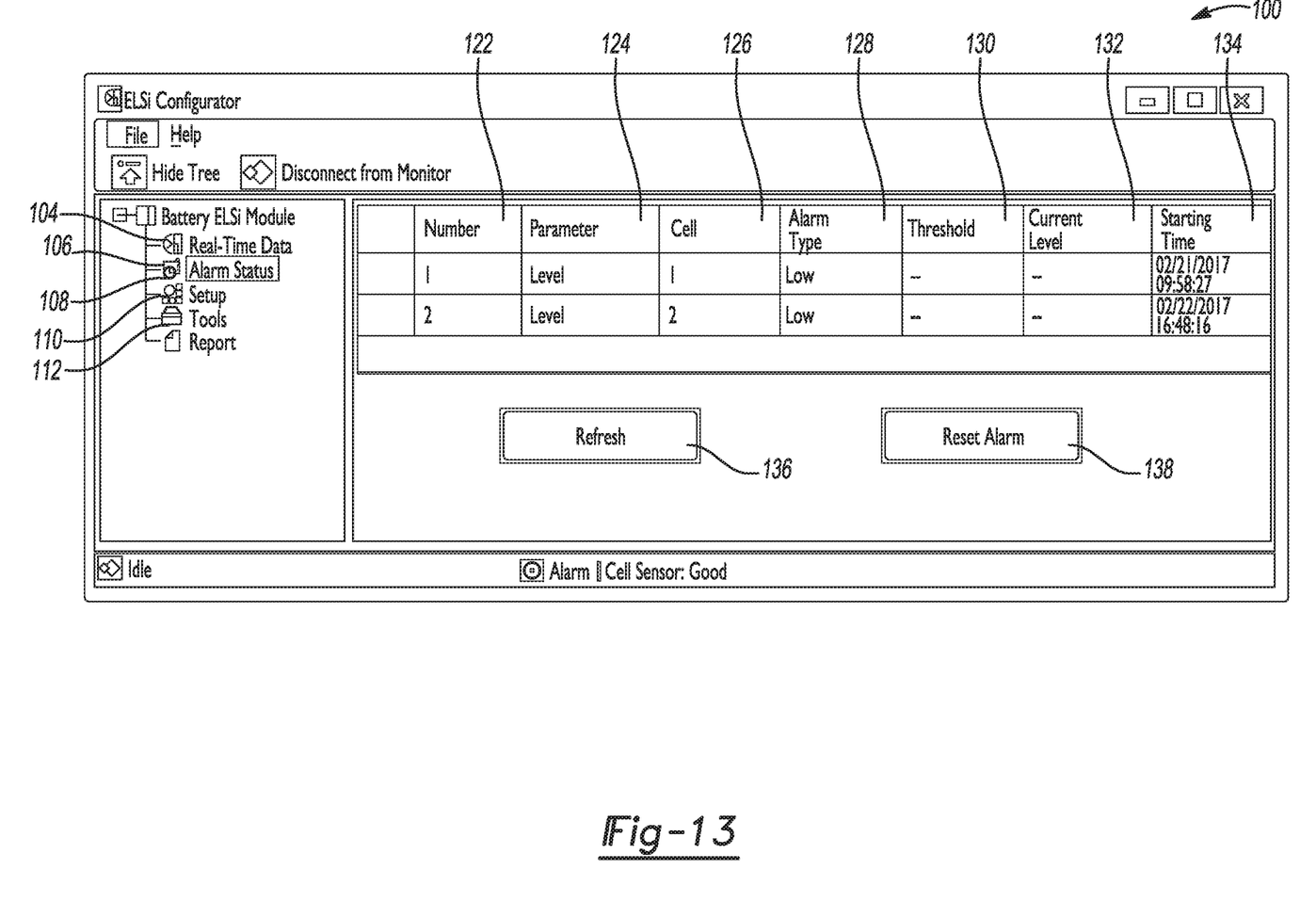
FIG. 13 illustrates information that may be displayed when selecting the "Alarm Status" selection of the configurator program.

FIG. 13 shows in greater detail the "Alarm Status" screen 106 of the configurator program 100. A "Number" field 122 lists the specific sensor number 12a-12h, a "Parameter" field 124 indicates the parameter for which information is being displayed (i.e., temperature or electrolyte level), a "Cell" field 126 lists the battery cell 14 that is associated with the specific numbered sensor, an "Alarm Type" field 128 shows any presently existing alarm, a "Threshold" field 130 indicates if the displayed parameter is below a predetermined user set threshold, a "Current Level" field 132 displays the last obtained reading (e.g., temperature reading from a given sensor 12a-12h), and a "Starting Time" field 134 gives a date and time when each sensor 12a-12h was put into operation. A "Refresh" selection 136 enables the data being displayed to be refreshed, while a "Reset Alarm" selection 138 enables any/all alarms provided by any one of the sensors 12a-12h to be reset.

Figure 14:
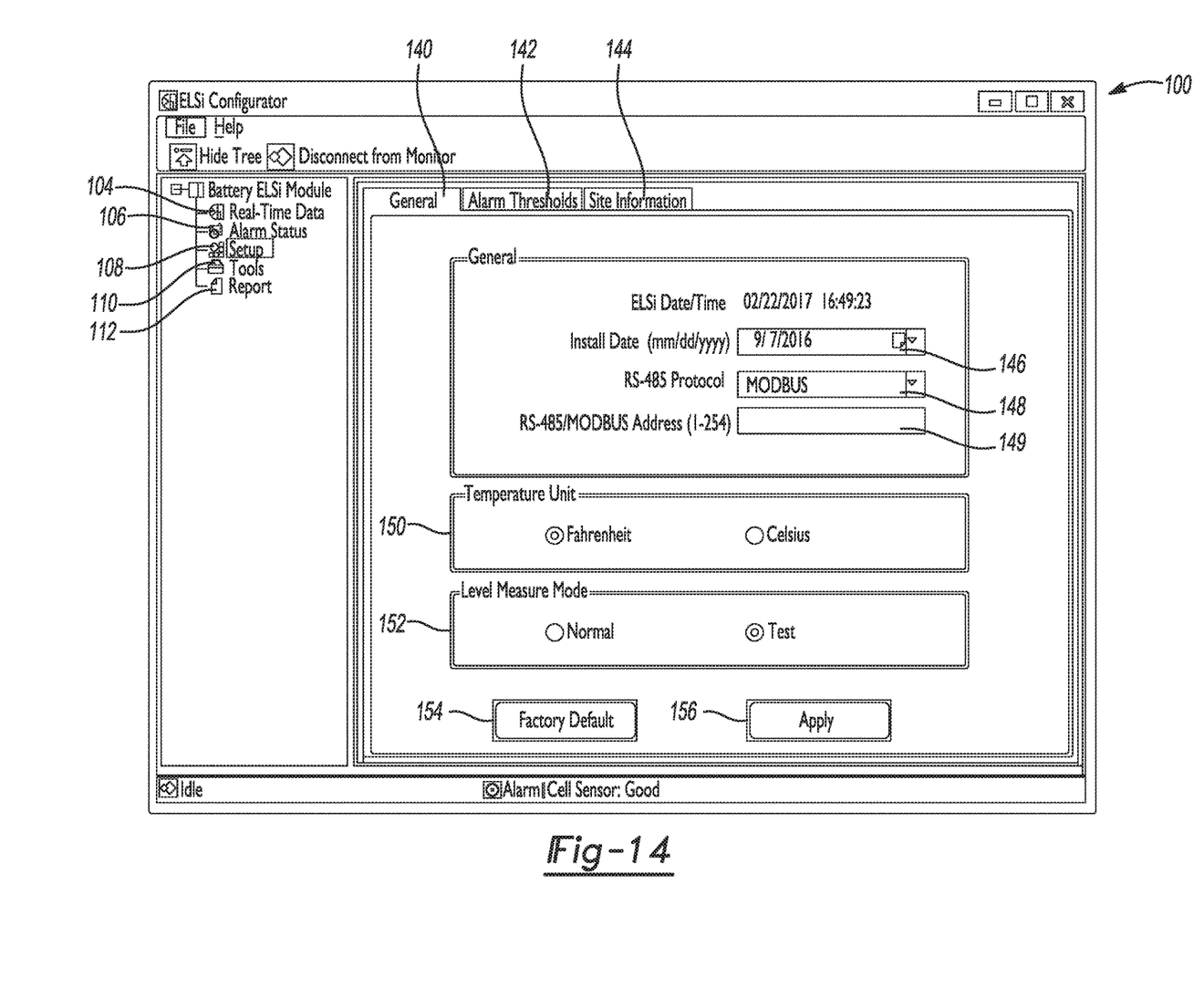
FIG. 14 illustrates a "Setup" selection tab that may be selected to allow the user to input different types of configuration information to configure the configurator program during an installation operation.

FIG. 14 illustrates information displayed via selection of the "Setup" tab 108. Selecting the Setup tab 108 causes the display of a "General" tab 140 of the configurator program 100, a tab for selecting information on "Alarm Thresholds" (tab 142) and a tab for selecting "Site Information" (tab 144). The General tab 140 displays fields allowing the user to input/configure an "Install Date" (field 146), to select a specific communications protocol (field 148), to set an RS-485/MODBUS address (field 149), to select a temperature unit (field 150), and to select a level measure mode, "Normal" or "Test" (field 152) for each sensor 12a-12h. A "Factory Default" selection 154 enables factory default settings to be applied for all of the fields 146-152, while an "Apply" selection 156 enables the selections in fields 146-152 to be applied when configuring the system 10.

Figure 15:
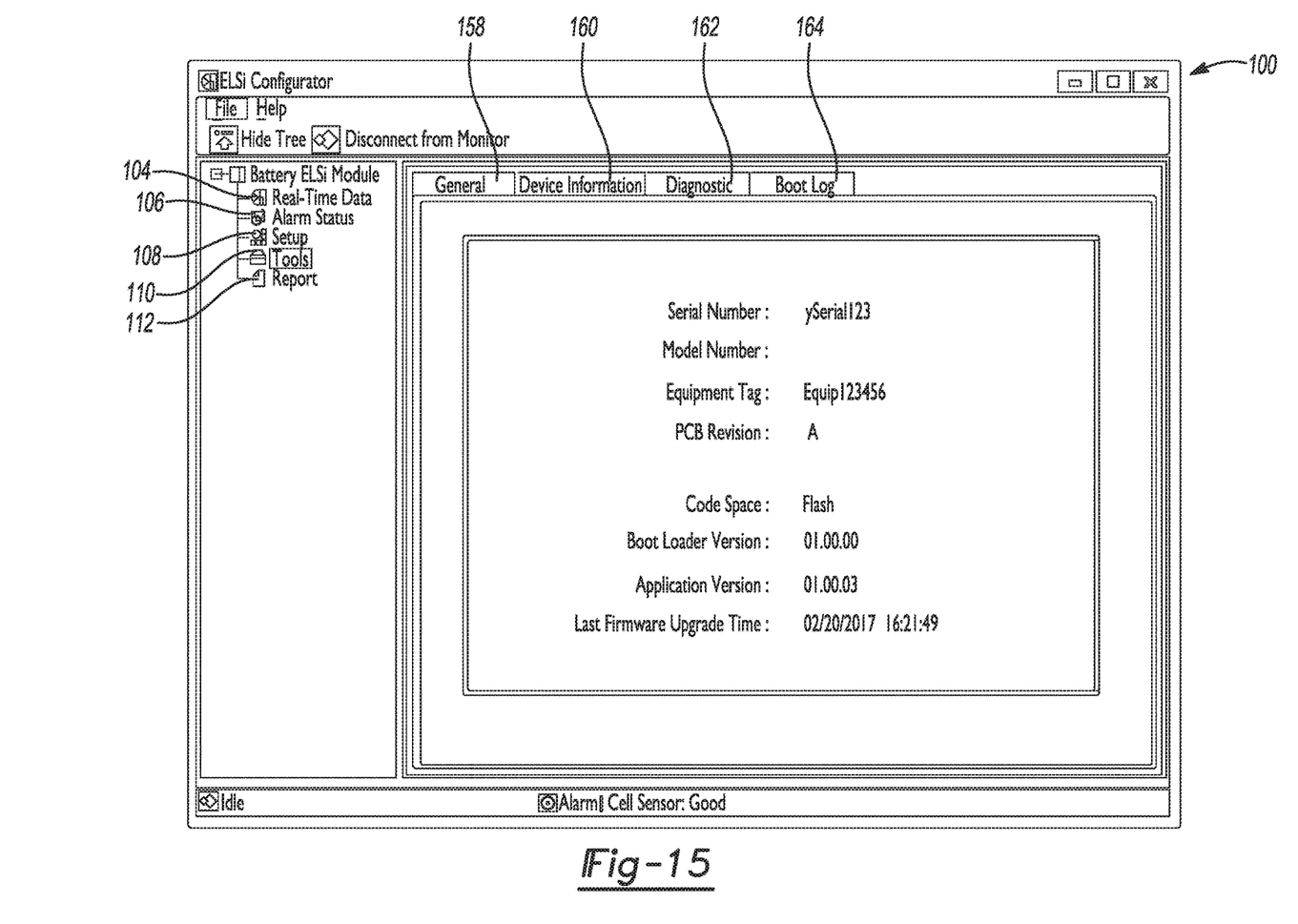
FIG. 15 illustrates a "Tools" selection page that may be displayed to show various information regarding firmware, the application version of the configurator program, and equipment identification information.

FIG. 15 shows the "Tools" screen 110 of the configurator program 100 in greater detail. The Tools screen 110 provides a tab for "General" 158, which illustrates a screen with various types of general information for the system 10. A tab for "Device Information" 160 enables the user to pull up specific information (e.g., firmware and revision information) on each sensor 12a-12h, as well as the interface module 24. A "Diagnostic" tab 162 enables the user to pull up diagnostic information associated with each sensor 12a-12h, while a "Boot Log" tab 164 enables the user to pull up information generated during a boot up process for the configurator program 100.

Figure 16:
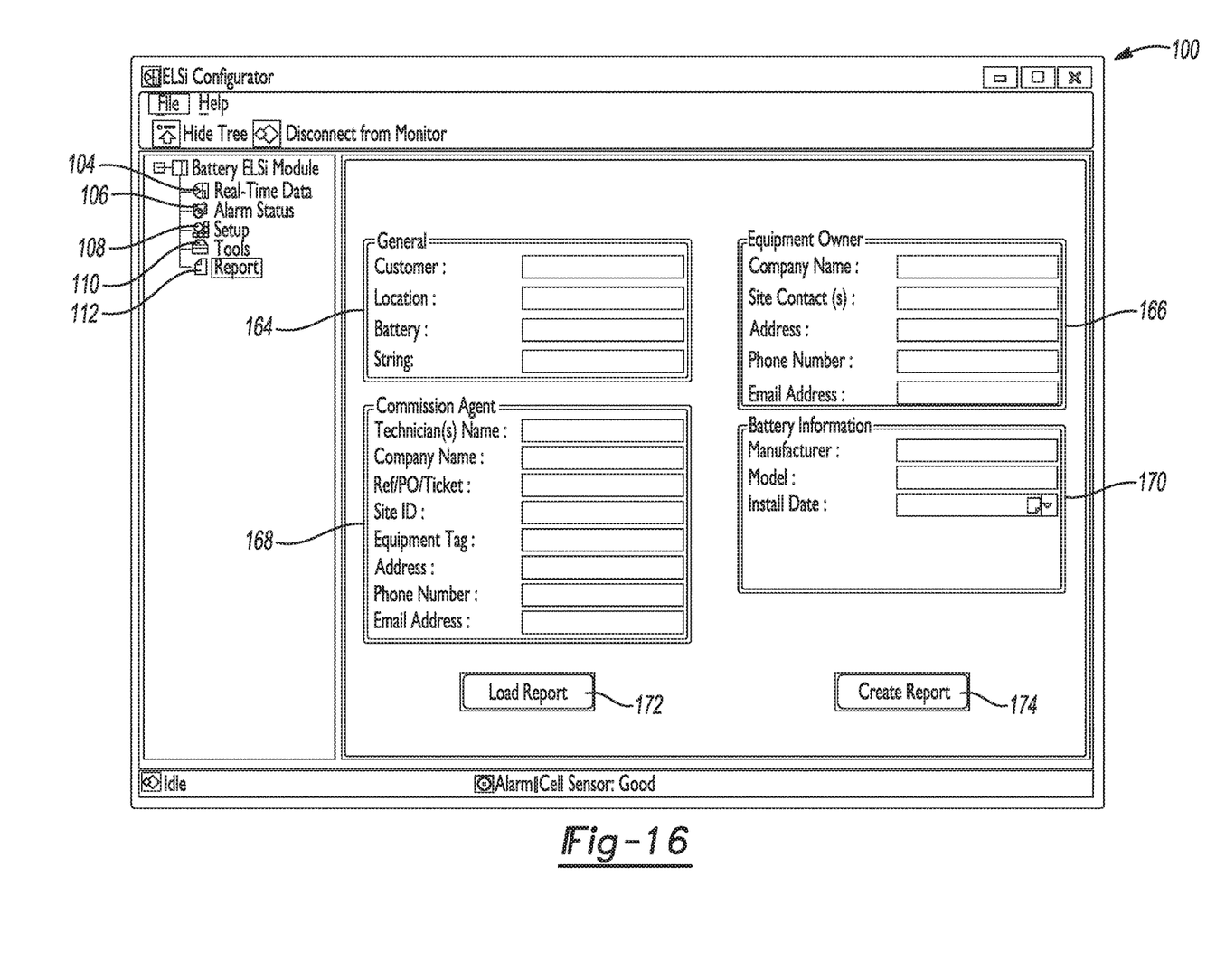
FIG. 16 illustrates various fields of differing types of information that may be input/displayed when selecting a "Report" selection on the configurator program.

FIG. 16 shows the "Report" tab 112 screen. This screen provides a "General" display field 164 for inputting/displaying general information about the specific application that the system 10 is deployed on. An "Equipment Owner" field 166 displays fields where the user can input/display information about the owner of the system 10. A "Commission Agent" field 168 provides additional fields where various types of information pertaining to the agent that monitors and/or installs the system 10 can be input and displayed. A "Battery Information" field 170 allows information pertaining to the battery that the system 10 is being used to monitor to be input/displayed. A "Load Report" selection 172 enables a previously created report relating to ownership/site/system configuration to be loaded. A "Create Report" selection 174 allows the user to create a report regarding ownership and/or site configuration and/or system configuration details.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An electrolyte monitoring system, comprising:
an interface module;
an infrared (IR) sensor supported from an exterior wall surface of a battery cell for monitoring a level of an electrolyte within the battery cell;
a cradle configured to be attachable to the exterior wall surface at a precise elevational location on the exterior wall surface, and including a plurality of flexible arm portions for receiving and retaining the IR sensor on the cradle without external fasteners; and
an alignment tool forming a plate having a T-shaped cutout, the alignment tool adapted to be removably positioned on the cradle, the alignment tool including an indicator enabling visual alignment with an electrolyte level marking on the battery cell, to assist in positioning the cradle on the exterior wall surface of the battery cell at a precise elevational position.

2. The system of claim 1, wherein the cradle further includes a planar wall portion for cooperating with the flexible arm portions to hold the IR sensor on the cradle.

3. The system of claim 2, wherein the cradle further includes a peripheral wall portion configured to be secured to the exterior wall surface of the battery cell.

4. The system of claim 3, wherein the peripheral wall portion is secured to the exterior wall surface of the battery cell by an adhesive.

5. The system of claim 1, wherein the alignment tool comprises a plate having a T-shaped cutout.

6. The system of claim 1, wherein the IR sensor comprises an integrated proximity and ambient light sensor.

7. The system of claim 6, wherein the IR sensor comprises an $I^2C$ interface, and wherein the IR sensor further comprises an interrupt function, all together on a single chip.

8. The system of claim 1, wherein the IR sensor includes an alarm LED for indicating a low electrolyte level alarm condition.

9. The system of claim 1, wherein the IR sensor includes a switch for placing the IR sensor in either a normal operating mode, wherein the IR sensor is used to sense a level of the electrolyte in the battery cell, or a test mode in which the IR sensor performs an electrolyte level scan at a predetermined time interval.

10. The system of claim 9, wherein when the switch is placed in the test mode, the IR sensor is further configured to perform a temperature reading repeatedly at a predetermined time interval.

11. The system of claim 1, wherein the IR sensor includes a manual reset control by which a user may reset the IR sensor after the IR sensor has detected an alarm condition.

12. An electrolyte monitoring system, comprising:
an interface module;
an infrared (IR) sensor supported from an exterior wall surface of a battery cell for monitoring a level of an electrolyte within the battery cell;
a cradle configured to be attachable to the exterior wall surface at a precise elevational location on the exterior wall surface, and including a plurality of flexible arm portions for receiving and retaining the IR sensor on the cradle without external fasteners;
wherein the IR sensor comprises an infrared emitter and an interface element, enabling the IR sensor to be intercoupled to at least one additional IR sensor in a daisy chained fashion; and
wherein the IR sensor includes a switch for placing the IR sensor in either a normal operating mode, wherein the IR sensor is used to sense a level of the electrolyte in the battery cell, or a test mode in which the IR sensor performs an electrolyte level scan at a predetermined time interval.

13. The system of claim 12, wherein the cradle further includes a planar wall portion for cooperating with the flexible arm portions to hold the IR sensor on the cradle.

14. The system of claim 13, wherein the cradle further includes a peripheral wall portion configured to be secured to the exterior wall surface of the battery cell.

15. The system of claim 14, wherein the peripheral wall portion is secured to the exterior wall surface of the battery cell by an adhesive.

16. The system of claim 12, further comprising an alignment tool adapted to be removably positioned on the cradle, the alignment tool including an indicator enabling visual alignment with an electrolyte level marking on the battery cell, to assist in positioning the cradle on the exterior wall surface of the battery cell at a precise elevational position.

17. The system of claim 16, wherein the alignment tool comprises a plate having a T-shaped cutout.

18. The system of claim 12, wherein the IR sensor comprises an integrated proximity and ambient light sensor.

19. The system of claim 18, wherein the interface element of the IR sensor comprises an $I^2C$ interface, and wherein the IR sensor further comprises an interrupt function, all together on a single chip.

20. The system of claim 12, wherein the IR sensor includes an alarm LED for indicating a low electrolyte level alarm condition.

21. The system of claim 12, wherein when the switch is placed in the test mode, the IR sensor is further configured to perform a temperature reading repeatedly at a predetermined time interval.

* * * * *